United States Patent
Merkel et al.

(10) Patent No.: US 12,509,419 B2
(45) Date of Patent: Dec. 30, 2025

(54) PROCESS FOR THE DISTILLATION OF ISOCYANATES

(71) Applicant: COVESTRO INTELLECTUAL PROPERTY GMBH & CO. KG, Leverkusen (DE)

(72) Inventors: Michael Merkel, Düsseldorf (DE); Martin Ehrig, Leverkusen (DE); Manfred Kobylka, Burscheid (DE); Peter Lehner, Mülheim an der Ruhr (DE); Tim Loddenkemper, Dormagen (DE); Martin Schiffhauer, Düsseldorf (DE)

(73) Assignee: Covestro Deutschland AG, Leverkusen (DE)

( * ) Notice: Subject to any disclaimer, the term of this patent is extended or adjusted under 35 U.S.C. 154(b) by 942 days.

(21) Appl. No.: 17/762,520

(22) PCT Filed: Sep. 23, 2020

(86) PCT No.: PCT/EP2020/076505
§ 371 (c)(1),
(2) Date: Mar. 22, 2022

(87) PCT Pub. No.: WO2021/063760
PCT Pub. Date: Apr. 8, 2021

(65) Prior Publication Data
US 2022/0380303 A1    Dec. 1, 2022

(30) Foreign Application Priority Data

Sep. 30, 2019 (EP) ..................... 19200482

(51) Int. Cl.
*C07C 263/20* (2006.01)
*B01D 3/10* (2006.01)

(52) U.S. Cl.
CPC ............ *C07C 263/20* (2013.01); *B01D 3/106* (2013.01)

(58) Field of Classification Search
CPC ........ C07C 263/20; B01D 3/106; B01D 3/10; F04C 19/004
See application file for complete search history.

(56) References Cited

U.S. PATENT DOCUMENTS

| | | | |
|---|---|---|---|
| 3,549,504 A | 12/1970 | Osamu et al. |
| 3,954,567 A | 5/1976 | Fischer et al. |
| 10,576,392 B2 | 3/2020 | Steffens et al. |
| 2006/0135810 A1 | 6/2006 | Wolfert et al. |
| 2007/0269309 A1 | 11/2007 | Muller et al. |

FOREIGN PATENT DOCUMENTS

| | | |
|---|---|---|
| DE | 2242626 A1 * | 3/1974 |
| DE | 10019718 A1 | 10/2001 |

OTHER PUBLICATIONS

International Search Report for PCT/EP2020/076505 issued on Dec. 15, 2020 by Authorized officer Seitner, Irmgard.

* cited by examiner

*Primary Examiner* — Deborah D Carr
(74) *Attorney, Agent, or Firm* — The Webb Law Firm

(57) ABSTRACT

The present invention relates to a process for distillative purification of a crude isocyanate obtained by phosgenation of the corresponding amine in a distillation apparatus under vacuum to obtain the corresponding isocyanate, characterized in that at least one liquid ring compressor is used to generate the vacuum in the distillation apparatus, a particular operating liquid is used for the at least one liquid ring compressor, the pressure p on the suction side of the at least one liquid ring compressor is 10 to 200 mbar(a), the operating temperature of the at least one liquid ring compressor is −17° C. to +15° C. and the operating liquid at the exit from the at least one liquid ring compressor has an AC value of less than 35 000 ppm, to a corresponding use of at least one liquid ring compressor for generating a vacuum in an apparatus for distillation of a crude isocyanate and to a corresponding process for operating a liquid ring compressor for providing the vacuum for distillative purification of an isocyanate obtained by phosgenation of the corresponding amine in a distillation apparatus to obtain the corresponding isocyanate.

13 Claims, No Drawings

PROCESS FOR THE DISTILLATION OF ISOCYANATES

CROSS REFERENCE TO RELATED APPLICATIONS

This application is a national stage application under 35 U.S.C. § 371 of PCT/EP2020/076505, filed Sep. 23, 2020, which claims benefit of European Application No. 19200482.8, filed Sep. 30, 2019, both of which are incorporated herein by reference in their entireties.

FIELD OF THE INVENTION

The present invention relates to a process for distillative purification of a crude isocyanate obtained by phosgenation of the corresponding amine in a distillation apparatus under vacuum to obtain the corresponding isocyanate, characterized in that at least one liquid ring compressor is used to generate the vacuum in the distillation apparatus, a particular operating liquid is used for the at least one liquid ring compressor, the pressure p on the suction side of the at least one liquid ring compressor is 10 to 200 mbar(a), the operating temperature of the at least one liquid ring compressor is −17° C. to +15° C. and the operating liquid at the exit from the at least one liquid ring compressor has an AC value of less than 35 000 ppm, to a corresponding use of at least one liquid ring compressor for generating a vacuum in an apparatus for distillation of a crude isocyanate and to a corresponding process for operating a liquid ring compressor for providing the vacuum for distillative purification of an isocyanate obtained by phosgenation of the corresponding amine in a distillation apparatus to obtain the corresponding isocyanate.

According to the invention, the term "isocyanate" is to be understood as meaning organic compounds having at least one isocyanate group which have been obtained by phosgenation of the corresponding amine.

BACKGROUND OF THE INVENTION

Various processes for isolating and purifying isocyanates from phosgenation reactions are described in the prior art. In the most commonly used processes, the crude solution from the phosgenation is first freed from excess phosgene. The solvent, usually chlorobenzene or dichlorobenzene, is then distillatively removed in the so-called solvent separation before the crude isocyanate thus obtained is in turn distillatively purified, usually in two or more stages. Many industrially important isocyanates are evaporated and withdrawn from the final distillation column overhead as a vapor stream or after condensation as a liquid sidestream.

The final distillation of various isocyanates that were in each case obtained by phosgenation of the corresponding amines is described for example in U.S. Pat. No. 3,549,504. Therein, the distillation is carried out in the presence of an inert gas and at a pressure at the top of the column of 5 to 200 mmHg, preferably 20 to 150 mmHg, so that the temperature at the bottom of the column may be kept as low as possible to avoid decomposition reactions. The exemplary embodiments in each case cite a head pressure of 30 mmHg for the distillation of xylylene diisocyanate (XDI) and tolylene triisocyanate, a head pressure of 20 mmHg for diphenylmethane diisocyanate (MDI), a head pressure of 50 mmHg for hexamethylene diisocyanate (HDI) and a head pressure of 40 mmHg for tolylene diisocyanate (TDI).

WO2017/076551 A1 describes a dividing wall column which is suitable for the distillation of isocyanates such as TDI, MDI, HDI, pentamethylene diisocyanate (PDI), isophorone diisocyanate (IPDI), XDI or dicyclohexylmethane diisocyanate ($H_{12}$MDI), wherein the desired isocyanate is in each case removed as a sidestream while low-boiling components are obtained at the top of the column. The distillation of a crude TDI mixture at a head pressure of 70 mbar is described as an exemplary embodiment.

A further description of a process for purifying isocyanates may be found in DE 10260092 A1. This describes initially separating hydrogen chloride, phosgene and solvent after the production of the isocyanate in order to obtain a crude isocyanate stream. This still contains components with a lower boiling point than the isocyanate, components with a higher boiling point than the isocyanate and a non-evaporable residue. The crude isocyanate is subjected to coarse distillation under vacuum at 1 to 120 mbar(a) and subsequently to fine distillation in at least one column at 1 to 80 mbar(a).

Further isocyanate is recovered in vaporous form at a pressure of 0.1 to 40 mbar(a) from the residue obtained in the coarse distillation and likewise supplied to the fine distillation. A distillation of TDI where the column has a head pressure of 18 mbar(a) is described as an exemplary embodiment.

DE 2242626 A1 describes a process for concentrating phosgene-containing solutions where an organic solvent is separated under vacuum from compounds containing nitrogen or oxygen having a higher boiling point, for example isocyanates. The vacuum is generated with a liquid ring pump, which uses a phosgene-containing solvent as the operating liquid. In the described process, a solvent is separated from an isocyanate in an evaporator, wherein the isocyanate is obtained as concentrate in the bottom of the evaporator. This is thus the solvent separation as part of the workup of a crude product from the phosgenation of an amine mentioned at the outset. Recited pressure ranges for operation of the evaporator are 5 to 2000 torr, preferably 50 to 500 torr, and the exemplary embodiment mentions a pressure of 160 torr. It is noted that it is possible to recirculate a substream of the operating liquid through a heat exchanger to remove the heat formed as a result of the drive means and the absorption of phosgene. It is also noted that phosgene accumulates in the operating liquid and can reduce the efficiency of the pump, thus necessitating continuous replacement. The absorption of phosgene in the operating medium is simultaneously described as an advantage of the process since this frees the offgas of phosgene. The document also mentions the possibility of using the described process in the final distillation, i.e. in the distillation of the isocyanate concentrate mentioned at the outset, since in this distillation any still bound phosgene may be separated and liberated.

However, in practice the use of liquid ring compressors in the final distillation of isocyanates produced by phosgenation of amines surprisingly results, time and again, in more or less pronounced cavitation which manifests in the form of noises through to mechanical damage to the compressor. Reducing the operating temperature could counter the problem but is on the one hand achievable only at considerable apparatus complexity and energy cost and on the other hand is limited at the latest by the solidification temperature of the respective operating liquid. The problem of cavitation occurs especially in the case of isocyanates which have a relatively low stability and must therefore be distilled as gently as possible, i.e. whose distillation, as known from the prior art cited above, requires the lowest possible pressure to largely avoid oligomerization and decomposition reactions.

Various approaches have already been tried in the past to avoid cavitation in liquid ring compressors. For example, DE 10019718 A1 describes cooling the aspirated gas using a cooling gas, preferably ambient air, before entry into the liquid ring compressor. This procedure is advantageous for aspirating hot vapors at high suction pressure but is unsuitable for the present case of use in isocyanate distillation since the measure is inadequate for the required low suction pressures. The required operating temperature of the liquid ring compressor is regularly below ambient temperature and the presence of volatile substances such as for example phosgene also aggravates the problem of cavitation.

WO 2006/029884 A1 describes a process for operating a liquid ring compressor where an ionic liquid is used as the operating liquid. This procedure too has various disadvantages. Firstly the ionic liquid, a previously unnecessary, usually costly, substance, is introduced into the process and requires procurement, storage, conveying and disposal. Furthermore, while the ionic liquid itself has no vapor pressure, the accumulation of volatile constituents of the aspirated liquid in said liquid cannot be ruled out. Even assuming that no volatile substances accumulate, the process would have the disadvantage that the desired effect of absorbing phosgene from the aspirated gas no longer applies. Finally, due to the functional groups present in ionic liquids and the high reactivity of for example phosgene, undesirable reactions between the ionic liquid and constituents of the aspirated liquid cannot be ruled out either.

DETAILED DESCRIPTION OF THE INVENTION

Starting from this prior art, it is an object of the present invention to distill isocyanates using liquid ring compressors for vacuum generation where even at a low suction pressure, in particular below 200 mbar(a), cavitation in the operating liquid is avoided. It is a further object of the invention to provide a process for generating a vacuum where a solvent already used in the production process may be employed as the operating liquid, where the offgas may be purified of phosgene and/or hydrogen chloride and where it is unproblematic when a liquid may be present in the aspirated stream in the form of droplets.

According to the invention, these objects are achieved by a process for distillative purification of a crude isocyanate obtained by phosgenation of the corresponding amine in a distillation apparatus under vacuum to obtain the corresponding isocyanate, wherein at least one liquid ring compressor is used for generating the vacuum in the distillation apparatus, an operating liquid selected from the group consisting of chlorobenzene, dichlorobenzene, xylene, 1-chloro-2,4-dimethylbenzene, chlorotoluene and mixtures thereof is used for the at least one liquid ring compressor, the pressure p on the suction side of the at least one liquid ring compressor is 10 to 200 mbar(a), the operating temperature of the at least one liquid ring compressor is −17° C. to +15° C. and the operating liquid at the exit from the at least one liquid ring compressor has an AC value of less than 35 000 ppm.

The present invention further provides a process for distillative purification of a crude isocyanate obtained by phosgenation of the corresponding amine in a distillation apparatus under vacuum to obtain the corresponding isocyanate, wherein at least one liquid ring compressor is used for generating the vacuum in the distillation apparatus, an operating liquid selected from the group consisting of chlorobenzene, dichlorobenzene, xylene, 1-chloro-2,4-dimethylbenzene, chlorotoluene and mixtures thereof is used for the at least one liquid ring compressor, the pressure p on the suction side of the at least one liquid ring compressor is 10 to 200 mbar(a), the operating temperature of the at least one liquid ring compressor is −17° C. to 15° C. and the operating liquid at the exit from the at least one liquid ring compressor has an AC value of less than 35 000 ppm, wherein determination of the AC value is carried out according to ASTM D 5629 for AC values <100 ppm and according to ASTM D 6099 for AC values >100 ppm, wherein the operating liquid in each case replaces the isocyanate as matrix.

The objects are further achieved according to the invention by the use of at least one liquid ring compressor for generating a vacuum in an apparatus for distillation of a crude isocyanate which was produced by phosgenation of the corresponding amine, wherein an operating liquid selected from the group consisting of chlorobenzene, dichlorobenzene, xylene, 1-chloro-2,4-dimethylbenzene, chlorotoluene and mixtures thereof is used for the at least one liquid ring compressor, the pressure p on the suction side of the at least one liquid ring compressor is 10 to 200 mbar(a), the operating temperature of the at least one liquid ring compressor is −17° C. to +15° C. and the operating liquid at the exit from the at least one liquid ring compressor has an AC value of less than 35 000 ppm.

The objects are further achieved according to the invention by the use of at least one liquid ring compressor for generating a vacuum in an apparatus for distillation of a crude isocyanate which was produced by phosgenation of the corresponding amine, wherein an operating liquid selected from the group consisting of chlorobenzene, dichlorobenzene, xylene, 1-chloro-2,4-dimethylbenzene, chlorotoluene and mixtures thereof is used for the at least one liquid ring compressor, the pressure p on the suction side of the at least one liquid ring compressor is 10 to 200 mbar(a), the operating temperature of the at least one liquid ring compressor is −17° C. to +15° C. and the operating liquid at the exit from the at least one liquid ring compressor has an AC value of less than 35 000 ppm, wherein determination of the AC value is carried out according to ASTM D 5629 for AC values <100 ppm and according to ASTM D 6099 for AC values >100 ppm, wherein the operating liquid in each case replaces the isocyanate as matrix.

The present invention preferably provides for the use according to the invention, wherein in the operating liquid at the exit from the liquid ring compressor the content of phosgene $c(COCl_2)$ is 0.001% to 4.5% by weight and the content of hydrogen chloride $c(HCl)$ is less than 1.6% by weight.

The objects are further achieved according to the invention by a process for operating a liquid ring compressor for providing the vacuum for distillative purification of an isocyanate obtained by phosgenation of the corresponding amine in a distillation apparatus to obtain the corresponding isocyanate, wherein an operating liquid selected from the group consisting of chlorobenzene, dichlorobenzene, xylene, 1-chloro-2,4-dimethylbenzene, chlorotoluene and mixtures thereof is used for the at least one liquid ring compressor, the pressure p on the suction side of the at least one liquid ring compressor is 10 to 200 mbar(a), the operating temperature of the at least one liquid ring compressor is −17° C. to +15° C. and the operating liquid at the exit from the at least one liquid ring compressor has an AC value of less than 35 000 ppm.

Finally, the objects are achieved according to the invention by a process for operating a liquid ring compressor for providing the vacuum for distillative purification of an isocyanate obtained by phosgenation of the corresponding amine in a distillation apparatus to obtain the corresponding isocyanate, wherein an operating liquid selected from the group consisting of chlorobenzene, dichlorobenzene, xylene, 1-chloro-2,4-dimethylbenzene, chlorotoluene and mixtures thereof is used for the at least one liquid ring compressor, the pressure p on the suction side of the at least one liquid ring compressor is 10 to 200 mbar(a), the operating temperature of the at least one liquid ring compressor is −17° C. to +15° C. and the operating liquid at the exit from the at least one liquid ring compressor has an AC value of less than 35 000 ppm, wherein determination of the AC value is carried out according to ASTM D 5629 for AC values <100 ppm and according to ASTM D 6099 for AC values >100 ppm, wherein the operating liquid in each case replaces the isocyanate as matrix.

The present invention is described in detail hereinbelow. The remarks, details and preferred embodiments recited below apply correspondingly to the process according to the invention for distillative purification of a crude isocyanate obtained by phosgenation of the corresponding amine, to the use according to the invention of at least one liquid ring compressor for generating a vacuum in an apparatus for distillation of a crude isocyanate and to the process according to the invention for operating a liquid ring compressor for providing the vacuum for distillative purification of an isocyanate obtained by phosgenation of the corresponding amine in a distillation apparatus.

In the context of the present invention at least one liquid ring compressor is used. It is possible according to the invention to employ in a corresponding apparatus, in particular a corresponding distillation apparatus, one or more, for example 2 to 8, liquid ring compressors, wherein, when more than one liquid ring compressor is present, one, some or all of the liquid ring compressors present may be operated according to the present invention.

The construction and operating principle of a liquid ring compressor are generally known to those skilled in the art. The function is based on an impeller having blades affixed to it which is eccentrically arranged in a usually cylindrical housing partly filled with an operating liquid. In operation the impeller rotates and the operating liquid present in the housing forms a liquid ring due to the centrifugal force. This results in the formation of gas-filled chambers between the blades which are delimited on the outside by the liquid ring and are of different sizes due to the eccentricity. The rotation of the impeller results in a continuous change in the size of the individual chambers so that on the suction side gas is aspirated from the suction port through one or more suction openings, this is then compressed and finally on the pressure side ejected through one or more pressure openings in the direction of the pressure port. A portion of the operating liquid forming the ring is always also ejected with the gas. This may be separated from the gas in a liquid separator and is in the context of the present invention referred to as "operating liquid at the exit from the liquid ring compressor". Said liquid may be reused as operating liquid optionally after cooling and/or admixing of further sufficiently cool liquid. Some designs of liquid ring compressors include an additional withdrawal port for operating liquid, for example to construct a larger cooling circuit. Due to the strong commixing in the compressor, the liquid withdrawn here corresponds to the operating liquid exiting with the gas at the pressure port.

A special form of liquid ring compressor is represented by side channel pumps where the impeller is arranged concentrically and the pumping effect is achieved by channel-like spaces of varying depth arranged laterally thereto. However, these are used as vacuum pumps only rarely.

Isocyanates/crude isocyanates which may be purified with the process according to the invention generally include any aliphatic, cycloaliphatic, araliphatic or aromatic isocyanates known to those skilled in the art.

The present invention particularly preferably provides the process according to the invention, wherein the isocyanate is selected from the group consisting of monoisocyanates, in particular R,S-1-phenylethyl isocyanate, 1-methyl-3-phenylpropyl isocyanate, pentyl isocyanate, 6-methyl-2-heptane isocyanate, cyclopentyl isocyanate or 3-(methylthio) phenyl isocyanate, diisocyanates, especially hexamethylene diisocyanate (HDI), pentamethylene diisocyanate (PDI), 1,4-butane diisocyanate, 1,8-diisocyanatooctane, 1,9-diisocyanatononane, 2-methylpentamethylene diisocyanate, 2,2-dimethylpentamethylene diisocyanate, neopentane diisocyanate, 2,2,4-trimethylhexamethylene diisocyanate and 2,4,4-trimethylhexamethylene diisocyanate, 3-isocyanatomethyl-3,5,5-trimethylcyclohexyl isocyanate (IPDI), 2,4'- and 4,4'-diisocyanatodicyclohexylmethane ($H_{12}$MDI), 4,4'-diisocyanato-3,3'-dimethyldicyclohexylmethane, 2,4- and 2,6-diisocyanatomethylcyclohexane ($H_6$TDI), 1,3-cyclohexane diisocyanate, 1,4-cyclohexane diisocyanate, 1,3-diisocyanato-2-methylcyclohexane, 1,3-diisocyanato-4-methyl-cyclohexane, 1,4-diisocyanato-3,3,5-trimethylcyclohexane, 1,3-bis(isocyanatomethyl)cyclohexane ($H_6$XDI), 1,4-bis(isocyanatomethyl)cyclohexane, the isomers of bis(isocyanatomethyl)bicyclo [2.2.1]heptane (NBDI), xylylene diisocyanate (XDI), in particular 1,3-xylylene diisocyanate (m-XDI) or 1,4-xylylene diisocyanate (p-XDI), 1,3-bis(1-isocyanato-1-methylethyl)benzene (m-TMXDI), 1,4-bis(1-isocyanato-1-methylethyl)benzene (p-TMXDI), monomeric diphenylmethane diisocyanate, 2,4-tolylene diisocyanate, 2,6-tolylene diisocyanate, 1,5-naphthalene diisocyanate or 1,4-phenylene diisocyanate, triisocyanates, in particular 4-isocyanatomethyl-1,8-octane diisocyanate, and mixtures thereof.

The process according to the invention is particularly preferably used for purifying an isocyanate selected from the group consisting of HDI, PDI, IPDI, H12MDI, XDI, H6-XDI, H6-TDI, MDI, NDI and mixtures thereof. The process is very particularly preferably used for purifying HDI, XDI, PDI or TDI. Precisely PDI and XDI, especially PDI, are obtained in the phosgenation with high proportions of chlorinated byproducts which, under thermal stress, can eliminate volatile compounds such as phosgene or hydrogen chloride and so the process according to the invention is advantageous in particular for the distillation of PDI and XDI, most advantageous for the distillation of PDI.

Processes for producing the isocyanates employed according to the invention are known per se to those skilled in the art. Organic isocyanates produced by phosgenation of the corresponding amines always contain different low- and high-boiling, partially chlorine-containing byproducts. The terms "low-boiling" and "high-boiling" are to be considered relative to the isocyanate. It is immaterial to the process according to the invention whether the phosgenation is carried out in the gas phase or in the liquid phase and whether the amine is directly reacted with phosgene, for example in a base phosgenation known to those skilled in the art, or whether it is initially converted into a salt with an acidic compound such as hydrogen chloride, as in the hydrochloride phosgenation known to those skilled in the art, or carbon dioxide, as in the carbamate phosgenation known to those skilled in the art, and then reacted with phosgene. Industrial processes are well known for all variants and are briefly outlined hereinbelow.

The present invention therefore provides the process according to the invention, wherein the crude isocyanate derives from a gas phase phosgenation or a liquid phase phosgenation, preferably from a liquid phase phosgenation.

If the phosgenation is carried out in the gas phase, the amine is preferably evaporated and heated to a temperature in the temperature range from 200° C. to 600° C. Optionally the evaporation and also the use of the amine vapors generated in the evaporation are carried out in the presence of an inert gas and/or of vapors of an inert solvent. The inert gas is preferably nitrogen. Suitable inert solvents are, for example, chlorobenzene, dichlorobenzene, especially o-dichlorobenzene, xylene, 1-chloro-2,4-dimethylbenzene, chlorotoluene, especially o-chlorotoluene, or mixtures thereof. Especially chlorobenzene and o-dichlorobenzene or mixtures thereof have proven technically advantageous and and are preferable since under the reaction conditions these on the one hand are very inert and on the other hand are generally easy to separate from the isocyanate due to their physical properties, in particular on account of their boiling point.

The phosgene used in the phosgenation is preferably used in excess based on the amine. An amount of phosgene corresponding to 150% to 350% of theory based on the proceeding phosgenation reaction is generally sufficient. The phosgene stream is preferably heated to a temperature in the range from 200° C. to 600° C. prior to the reaction.

To perform the phosgenation, the preheated, amine-containing stream and the likewise preheated phosgene stream are preferably continuously passed into a cylindrical reaction space and mixed with one another therein. Suitable cylindrical reaction spaces are for example tubular reactors which generally consist of steel, glass, alloyed and/or enameled steel. They generally have a length which is sufficient to allow complete reaction of the amine with the phosgene under the process conditions. Furthermore, the dimensions of the reaction space are preferably selected such that a turbulent flow having a Reynolds number of at least 2500 prevails in the reaction space. This is generally ensured when the flow rate is more than 90 m/s. Such a flow rate may be ensured by adjusting an appropriate differential pressure between the product conduits to the reaction space and the exit from the reaction space. In general the pressure in the feed conduits is 200 to 300 mbar(g) and at the exit from the reaction space is 150 to 200 mbar(g).

Upon termination of the phosgenation reaction in the reaction space the mixture continuously exiting the reaction space is preferably freed of the isocyanate formed. This may be effected for example by selective condensation in an inert solvent such as for example chlorobenzene or dichlorobenzene. If the amine-containing stream already contained an inert solvent, it is preferable to use the same inert solvent here. The temperature of the solvent is preferably chosen such that on the one hand it is above the decomposition temperature of the carbamide acid chloride corresponding to the isocyanate and on the other hand the isocyanate condenses or dissolves in the solvent while phosgene, hydrogen chloride and any inert gas pass through the condensation stage in gaseous form. Solvent temperatures of 120° C. to 200° C. are particularly suitable.

The gas mixture passing through the condensation stage to recover the at least one isocyanate is then preferably freed of excess phosgene in a manner known per se. This may be carried out using a cold trap, absorption in an inert solvent (for example chlorobenzene, MCB or dichlorobenzene, ODB) at a temperature of −10° C. to 8° C. or by adsorption and hydrolysis on activated carbon. The hydrogen chloride gas passing through the phosgene recovery stage may preferably be recycled in a manner known per se to recover the chlorine required for phosgene synthesis.

Another embodiment of the phosgenation is the phosgenation of amines in the liquid phase. The reaction may then be carried out in various ways, each of which is known to those skilled in the art. Either the amine is directly reacted with phosgene in an inert liquid medium, so-called base phosgenation, or the amine is initially converted into the corresponding salt by reaction with hydrogen chloride gas or carbon dioxide in an inert liquid medium and then reacted with phosgene, so-called hydrochloride or carbamate phosgenation. Suitable liquid media for all phosgenations include in particular chlorobenzene and/or dichlorobenzene.

In base phosgenation the reaction is performed in two stages in the inert liquid medium. Such reactions are described for example in W. Siefken, Liebigs Annalen der Chemie, 562 (1949) p. 96. In the first stage, the cold phosgenation, the temperature of the reaction mixture is preferably maintained in a range between 0° C. and 100° C. This forms a suspension which contains carbamic acid chloride, amine hydrochloride and small amounts of free isocyanate. It is preferable to initially charge a solution of phosgene in an inert solvent and then add a solution or suspension of the amine in the same solvent and optionally further phosgene. This keeps the concentration of free amine low and thus inhibits undesired formation of ureas.

In the second stage, the hot phosgenation, the temperature is increased and is preferably in a range from 120° C. to 200° C. It is maintained in this range while further phosgene is supplied until the reaction to afford the isocyanate has terminated, i.e. the evolution of HCl comes to a halt. Phosgene is advantageously used in excess. If required, the reaction may be performed with introduction of an inert gas both in the cold phosgenation and in the hot phosgenation.

In the hydrochloride or carbamate phosgenation, the amine is preferably initially reacted with hydrogen chloride gas or carbon dioxide in an inert liquid medium to produce the corresponding salt. The reaction temperature during this salt formation is preferably in a range from 0° C. 80° C. The phosgenation step follows as a second step which is substantially similar to the hot phosgenation from the above-described base phosgenation. Here too, the temperature is therefore preferably kept in the range from 120° C. to 200° C. while phosgene and optionally an inert gas are introduced into the reaction mixture. The introduction is carried out until the reaction to form the isocyanate has terminated. Here too, phosgene is preferably employed in excess to accelerate the reaction.

After termination of the reaction both in the base phosgenation and in the hydrochloride or carbamate phosgenation, the remaining phosgene and hydrogen chloride gas are preferably blown out with an inert gas, preferably with nitrogen. If necessary, a filtration may be carried out to remove any solids such as for example unconverted hydrochloride.

The reaction product initially generated in such a phosgenation contains not only the desired isocyanate but also residues of hydrogen chloride, phosgene, solvent and also impurities and non-evaporable residue. The crude isocyanate to be purified according to the invention is preferably such a reaction product from which phosgene and hydrogen chloride have already been separated in one or more steps, preferably by distillation.

It is particularly preferable when the crude isocyanate to be purified according to the invention is a crude isocyanate where the majority of solvent has already been separated. Accordingly the crude isocyanate preferably contains only traces of phosgene and hydrogen chloride and a small amount of solvent. It further contains other low-boiling secondary components and high-boiling secondary components and non-evaporable residue. At least some of the secondary components and/or of the non-evaporable residue are preferably chlorine-containing compounds.

The content of hydrolyzable chlorine (HC value) in isocyanates may be determined according to ISO 15028: 2014 and is preferably 200 to 20 000 ppm for the crude isocyanate employed according to the invention.

According to the invention, the crude isocyanate is distilled under vacuum to minimize yield losses due to oligomer formation and/or decomposition of the isocyanate. The distillation may be in principle be carried out in any suitable distillation apparatus known to those skilled in the art. This generally comprises at least one evaporator for evaporating at least a portion of the crude isocyanate and a condenser for at least partially condensing the vapor stream thus produced. The distillation apparatus preferably further comprises at least one distillation column with or without a dividing wall. It is preferable to employ internals known to those skilled in the art, for example random packings, bubble-cap trays, sieve trays, dual-flow trays, structured packings etc., for example to improve separation performance. It is particularly preferable according to the invention to employ internals which cause a low pressure drop such as for example structured packings, random packings or dual-flow trays.

The distillation apparatus employed according to the invention is connected, preferably fluidically, to an apparatus for generating negative pressure in the distillation apparatus. According to the invention, this apparatus comprises a liquid ring compressor. Liquid ring compressors have great advantages compared to other compressors such as for example dry compressors for the distillation of isocyanates from phosgenation. Thus for example they are insensitive to droplets entrained in the liquid and do not tend to suffer from deposits, for example through decomposition of organic compounds introduced with the vapor stream. They can simultaneously also function as gas scrubbers so that for example phosgene present in the vapor stream is at least partially scrubbed out to obtain a more unconcerning offgas stream. However, the negative pressure (suction pressure) achievable by the liquid ring compressor is limited by the principle of operation.

Thus if according to the invention a particularly low pressure, for example 0.1 to 30 mbar(a), is to be established in the distillation apparatus, it is therefore possible to employ, between the distillation apparatus and the at least one liquid ring compressor present, one or more pre-compressors having the same principle of operation or a different principle of operation. These may include for example gas ejectors, screw compressors, gas ring pumps or rotary blowers. In such an embodiment, it may be advantageous to perform a condensation between the pre-compressor and the liquid ring compressor to minimize the conveying stream for the liquid ring compressor.

In a further embodiment of the invention, a plurality of distillation apparatuses are analogously connected, preferably fluidically, to the at least one liquid ring compressor. These distillation apparatuses may be selected for example from the group consisting of a distillation apparatus for separating the solvent from the reaction output already freed of phosgene and hydrogen chloride, a distillation apparatus for workup of the reaction solvent, a distillation apparatus for residue concentration, a distillation apparatus for removing further low boilers from the crude isocyanate concentrate already freed of phosgene, hydrogen chloride and solvents and an apparatus for final distillation of the crude isocyanate.

In a preferred embodiment, the offgases of a plurality of distillation apparatuses are combined in a collection conduit and from there together passed into the aspiration port of the at least one liquid ring compressor. The offgas streams from the various distillation apparatuses may each be subjected to a gas scrubbing after the condensation of the vapors. The offgas streams may be scrubbed individually or else in common in any desired combinations. It is preferable when individual gas streams are scrubbed before the offgas is combined in the collection conduit.

Suitable gas scrubbers in principle include all apparatuses in which a gas stream may be contacted with a liquid stream, i.e. for example submerged scrubbers, spray scrubbers, random packed columns, fluidized bed scrubbers or rotary scrubbers. Preference is given to those having a low pressure drop for the gas flowing through, for example random packed columns or spray scrubbers. The uncondensed offgas is preferably passed through the gas scrubber from bottom to top while the solvent passes through the scrubber in countercurrent, i.e. from top to bottom.

Preferred solvents employed in the scrubbing of the gas stream are the abovementioned solvents which may also be used in the production of the isocyanate, for example chlorobenzene, dichlorobenzene, in particular o-dichlorobenzene, xylene, 1-chloro-2,4-dimethylbenzene, chlorotoluene, in particular o- or m-chlorotoluene, or mixtures thereof, preferably chlorobenzene and/or o-dichlorobenzene. It is very particularly preferable to use the same solvent for the scrubbing of the gas stream which was also employed in the production of the isocyanate. The temperature of the solvent is preferably between −20° C. and +10° C. and particularly preferably not more than the operating temperature of the at least one liquid ring compressor. In this preferred manner, volatile organic compounds and phosgene are at least partially scrubbed out of the offgas stream to obtain a prepurified offgas stream. By contrast, hydrogen chloride is under these conditions removable from the offgas stream only to a very limited extent and therefore largely remains in the offgas. In fact it is often the main constituent.

According to the invention, it is also possible to reduce the content of hydrogen chloride by scrubbing with suitable inorganic scrubbing media, for example a solution of silver sulfate in concentrated sulfuric acid.

According to the invention, the at least one liquid ring compressor is generally operated at a pressure p (suction pressure) of 10 to 200 mbar(a), preferably 20 to 150 mbar(a) and particularly preferably 30 to 120 mbar(a).

The recited pressure range is sufficient for many distillation tasks in the purification of crude isocyanates and allows distillation while largely avoiding decomposition reactions. If according to the invention a lower pressure is required, this may achieved as described above through the use of a pre-compressor having a different principle of operation or the same principle of operation.

In the process according to the invention, suitable operating liquids for producing the liquid ring in the at least one liquid ring compressor generally include solvents as can also used in the production of the isocyanate, i.e. for example chlorobenzene, dichlorobenzene, in particular o-dichlorobenzene, xylene, 1-chloro-2,4-dimethylbenzene, chlorotoluene, in particular o- or m-chlorotoluene, or mixtures thereof, preferably chlorobenzene and/or o-dichlorobenzene. These operating liquids are largely inert under the operating conditions and have advantageous melting and boiling points for use as the operating liquid. The operating liquid is particularly preferably the same solvent as also employed in the production of the isocyanate. This makes it possible to omit an additional workup of the operating medium since this may be carried out together with the solvent used in the production.

The operating temperature of the at least one liquid ring compressor is presently to be understood as meaning the temperature of the liquid discharged at the pressure port. The operating temperature of the at least one liquid ring compressor in the process according to the invention is generally from −17° C. to +15° C. Higher temperatures increase the vapor pressure of the operating liquid and thus reduce the possible suction pressure when operating the at least one liquid ring compressor. Lower operating temperatures increase the energy costs and apparatus complexity for cooling the operating liquid as well as the viscosity thereof. The latter factor results in a further increase in the already high energy consumption for conveying the operating liquid. The operating temperature of the liquid ring compressor is preferably −15° C. to +12° C., particularly preferably −12° C. to +10° C.

Even if the reaction product from the phosgenation has already been freed of hydrogen chloride and phosgene previously, the offgases from the distillation apparatus obtained in the distillative purification of the crude isocyanate in the process according to the invention typically still contain small amounts of phosgene. This may be due on the one hand to incomplete separation of the phosgene in the preceding distillation steps but it may also be formed for example by elimination of phosgene from chlorine-containing low-boiling secondary components. This phosgene may advantageously be at least partially scrubbed out through the use according to the invention of at least one liquid ring compressor for generating a vacuum in the distillation apparatus. This reduces the amount of phosgene in the offgas, thus making it safer to handle and easier to dispose of.

The phosgene is therefore preferably at least partially dissolved in the operating liquid so that said liquid at the exit from the at least one liquid ring compressor preferably has a content of phosgene of 0.001% to 4.5% by weight, preferably 0.005% to 2% by weight, particularly preferably 0.01% to 1% by weight and most preferably 0.05 to 0.5% by weight. Lower contents of phosgene require a disproportionately high use of fresh, low-phosgene or phosgene-free operating liquid which requires subsequent workup. Enrichment to higher contents results in an undesired increase in the total amount of the hazardous substance phosgene present in the plant and increases the risk of cavitation occurring at the at least one liquid ring compressor.

However, it has now been found according to the invention that even when maintaining low phosgene contents in the operating liquid, problems with cavitation often occur when the content of acidic chlorine compounds, also referred to as the AC value, AC content or simply acidity, increases. Determination of the AC value is carried out according to ASTM D 5629 for AC values <100 ppm and according to ASTM D 6099 for AC values >100 ppm, wherein the operating liquid replaces the isocyanate as matrix.

For reliable operation of the at least one liquid ring compressor, it is necessary according to the invention for the operating liquid at the exit from the at least one liquid ring compressor to have an AC value of less than 35 000 ppm, preferably less than 25 000 ppm and particularly preferably less than 15 000 ppm.

The presence of hydrogen chloride particularly increases the risk of cavitation occurring. Therefore, in a preferred embodiment of the invention, the process is operated such that the operating liquid exiting from the at least one liquid ring compressor at the pressure port has a content of HCl which is ≤1.6% by weight, preferably ≤1% by weight, particularly preferably ≤0.5% by weight and very particularly preferably ≤0.2% by weight. The content of HCl is preferably at least 1 ppm, particularly preferably at least 10 ppm, very particularly preferably at least 20 ppm and most preferably at least 50 ppm.

This allows cavitation to be markedly reduced or even completely avoided in the process according to the invention. Those skilled in the art are aware that factors also playing a role in the occurrence of cavitation may include the operating temperature, the suction pressure and any gas ballast with an inert gas. A higher operating temperature, a lower suction pressure and a lower or lacking gas ballast have negative consequences and it is therefore advisable to more strictly limit the HCl content in such cases. Furthermore, as mentioned hereinabove, the phosgene content in the operating liquid also plays a role. The propensity for cavitation increases with increasing phosgene content in the operating liquid and it is thus in turn advantageous to establish an even lower hydrogen chloride content.

In a preferred embodiment, the present invention provides the process according to the invention, wherein in the operating liquid at the exit from the at least one liquid ring compressor the content of phosgene $c(COCl_2)$ is 0.001% to 4.5% by weight, preferably 0.005% to 2% by weight, particularly preferably 0.01% to 1% by weight, most preferably 0.05% to 0.5% by weight, and the content of hydrogen chloride $c(HCl)$ is <1.6% by weight, preferably <1% by weight, particularly preferably <0.5% by weight and very particularly preferably <0.2% by weight.

In a particularly preferred embodiment of the invention, the content of hydrogen chloride in the operating liquid upon exiting the compressor is therefore below a maximum content $c_{max}(HCl)$ according to general formula (I), wherein, for formula results below 0.01%, a maximum content $c_{max}(HCl)$ of 0.01% by weight applies:

$$c_{max}(HCl) = p_{suct}/10^{\wedge}(6.115 - 900/(T+279)) - c(COCl_2)/100 \qquad (I),$$

wherein $c_{max}$(HCl), $p_{suct}$, T and c(COCl$_2$) are defined as follows $c_{max}$(HCl) maximum content of hydrogen chloride in the operating liquid in % by wt $p_{suct}$ suction pressure of the liquid ring compressor in mbar(a)

T operating temperature of the liquid ring compressor in ° C.

c(COCl$_2$) content of phosgene in the operating liquid in % by wt

The contents of phosgene and HCl in the operating liquid may be influenced according to the invention in different ways and in some cases independently of one another. As already described hereinabove, it is possible for example for at least one offgas stream from a distillation apparatus connected to the liquid ring compressor, preferably fluidically, i.e. which contributes to the generation of the vacuum in this distillation apparatus, to be subjected to a gas scrubbing in a gas scrubber. This allows the import of phosgene and/or hydrogen chloride into the liquid ring compressor to be influenced by way of the employed scrubbing liquid and operating conditions such as temperature, saturation, liquid quantity etc. Alternatively, the operating liquid itself may be treated by stripping with an inert gas for example. This may be carried out either in the at least one liquid ring compressor itself or else externally in a separate apparatus.

In a further, preferred embodiment of the process according to the invention, the contents of hydrogen chloride and/or phosgene in the operating liquid are influenced by replacing used operating liquid at least partially with fresh/ worked up operating liquid. A special case of this embodiment represents a process where the operating liquid is heated after exiting the liquid ring compressor to expel and separate previously dissolved volatile compounds and then cooled down again for reintroduction into the liquid ring compressor as operating liquid.

A portion of the operating liquid is also ejected with the compressed gas at the pressure port. In a preferred embodiment of the process according to the invention, the liquid exiting at the pressure port, preferably containing gas and operating liquid, is separated in a liquid separator after exiting the at least one liquid ring compressor. It is preferable when at least a portion of the separated operating liquid, preferably after cooling in a cooler, is then recirculated via a recycling conduit, i.e. recycled to the entry port for operating liquid. The cooling preferably carried out according to the invention makes it possible to advantageously remove the heat resulting for example from compression, condensation and absorption and establish the operating temperature in the desired range.

It is preferable when a substream of the operating liquid is removed from the system either continuously or discontinuously and replaced by fresh or worked up operating liquid, referred to hereinbelow as replacement operating liquid. This allows the phosgene content in the operating liquid at the exit from the at least one liquid ring compressor to be advantageously adjusted to the ranges according to the invention. The replacement operating liquid may be introduced into the system at various points. Said liquid may be for example introduced into the recycling conduit, supplied via a separate operating liquid port at the at least one liquid ring compressor itself or introduced into a liquid separator. It is preferable when, before introduction into the operating liquid, the replacement operating liquid is brought to a temperature of not more than 20° C., preferably not more than 15° C., particularly preferably not more than 10° C. and very particularly preferably not more than 5° C. above the operating temperature of the at least one liquid ring compressor. The temperature of the replacement operating liquid is particularly preferably not more than the operating temperature of the liquid ring compressor and is above the solidification temperature of the replacement operating liquid. The replacement operating liquid preferably has a content of phosgene of <1000 ppm, preferably <100 ppm, particularly preferably <20 ppm. In addition, the replacement operating liquid preferably contains <250 ppm, preferably <100 ppm, particularly preferably <50 ppm of hydrogen chloride. Hydrogen chloride contents of <1 ppm, preferably <5 ppm, particularly preferably <10 ppm, essentially no longer contribute to an improvement in the process and are therefore not necessary.

The present invention therefore preferably provides the process according to the invention, wherein at least a portion of the operating liquid is continuously withdrawn from the at least one liquid ring compressor, cooled to a temperature of not more than 20° C., preferably not more than 15° C., particularly preferably not more than 10° C. and very particularly preferably not more than 5° C. below the operating temperature of the at least one liquid ring compressor and then continuously recycled to the at least one liquid ring compressor.

In a preferred embodiment, the replacement operating liquid contains a solvent, preferably consists of a solvent, which has already been employed in a phosgenation and preferably worked up by distillation. In this case, said solvent has a phosgene content of by preference <1000 ppm, preferably <100 ppm and particularly preferably <20 ppm but simultaneously preferably >1 ppm, particularly preferably >5 ppm and particularly preferably >10 ppm. A further reduction in the phosgene content would require a disproportionately high cost and complexity for purification of the solvent.

The present invention therefore preferably provides the process according to the invention, wherein the operating liquid in the at least one liquid ring compressor is at least partially, preferably continuously, replaced by operating liquid having a phosgene content of <1000 ppm, preferably <100 ppm, particularly preferably <20 ppm.

The present invention also provides isocyanate obtainable, preferably obtained, by the process according to the invention.

EXAMPLES

Method for Determining the AC Value (Acidity) of the Operating Liquid:

Determination of the AC value (acidity) is carried out according to ASTM D 5629 for AC values <100 ppm and according to ASTM D 6099 for AC values >100 ppm, wherein the respective operating liquid replaces the isocyanate mentioned in the method as matrix.

Method for Determining the Phosgene Content in the Operating Liquid:

The phosgene content of the operating liquid can be determined by infrared spectroscopy. For this purpose, extinction spectra of the corresponding pure operating medium and the sample of the operating liquid are measured. Then the intensity of the carbonyl band of the phosgene at about 1806 cm' in the spectrum of the operating liquid is measured after subtracting the spectrum of the pure operating medium. Determination of the phosgene content is carried out by calibration with samples each having a known phosgene content while taking into account their origin. Measurement is carried out in CaF$_2$ cuvettes of suitable path length, so that the extinction, if necessary after dilution, is in the range from 0.01 to 1.50 with a resolution of 4 cm$^{-1}$ and at least 4 scans.

Determining the HCl Content in the Operating Liquid:

In the present case, the HCl content (hydrogen chloride content) of the operating liquid is the difference between the phosgene content and the AC value (acidity) of the operating liquid.

Example 1

Hexamethylene diisocyanate which was obtained from a gas phase phosgenation of hexamethylenediamine and from which hydrogen chloride, phosgene, chlorobenzene and low-boiling secondary components had already been largely removed in a multi-stage distillation process was subjected as crude isocyanate to a continuous final distillation under vacuum. The crude isocyanate had an HC content according to ISO 15028:2014 of about 8000 ppm. The distillation was carried out in a column with an internal condenser at a head pressure of 50 mbar(a). The vapors exiting at the top of the column were scrubbed with chlorobenzene in a gas scrubber. The scrubbed vapor stream was cooled to −11° C. in a cooler and aspirated with a liquid ring compressor to generate the negative pressure. A pressure sensor installed directly upstream of the aspiration port indicated a suction pressure of 30 mbar. The liquid ring compressor was operated with chlorobenzene as the operating liquid at an operating temperature of −2° C. in recirculating liquid operation, i.e. the exiting operating liquid was recycled back to the entry port for operating liquid via a cooler. A portion of the operating liquid was continuously discharged and replaced by redistilled chlorobenzene having a phosgene content of 10 ppm and a hydrogen chloride content of 2 ppm. The amount of operating liquid to be replaced was adapted at regular intervals such that an AC value of 2150 ppm was established in the operating liquid exiting on the pressure side. The phosgene content was determined as 0.25% by weight and the calculated hydrogen chloride content was accordingly 0.03% by weight.

The liquid ring compressor was able to be operated over an extended period without cavitation problems.

Example 2

The distillation was carried out analogously to example 1, but this time the offgas stream was combined with the offgas stream from a column for solvent separation from the reaction product in a collection conduit. The offgas stream from the solvent separation had hydrogen chloride as the main constituent and additionally contained chlorobenzene and traces of phosgene. The combined offgas stream from the collection conduit was then subjected to the same further processing as the scrubbed vapor stream from example 1.

The replacement rate of the operating liquid of the liquid ring compressor was chosen such that an AC value of 9000 ppm was established in the operating liquid exiting on the pressure side. The phosgene content was determined as 0.007% by weight and the calculated hydrogen chloride content was accordingly 0.9% by weight.

The liquid ring compressor was able to be operated over an extended period but slight cavitation noises were periodically audible.

Example 3

Starting from the operating state in example 2, in a test operation the replacement rate of the operating liquid was reduced, thus causing the AC value of the operating liquid exiting on the pressure side to increase to 18 100 ppm. The phosgene content was determined as 0.014% by weight and the calculated hydrogen chloride content was accordingly 1.8% by weight.

Operating the liquid ring compressor in this way resulted in more severe cavitation noises, vibrations and an increase in the pressure measured at the suction port.

The problems were able to be overcome by lowering the operating temperature to −12° C. and increasing the pressure in the aspiration port to 80 mbar(a).

Example 4

Tolylene diisocyanate which was obtained from a gas phase phosgenation of tolylenediamine and from which hydrogen chloride, phosgene and o-dichlorobenzene had already been largely removed in a multi-stage distillation process was subjected as crude isocyanate to a continuous final distillation under vacuum. The crude isocyanate had an HC content according to ISO 15028:2014 of about 12 000 ppm. The distillation was carried out in a dividing wall column having an internal condenser at a head pressure of 135 mbar(a), wherein a stream containing low-boiling secondary components and o-dichlorobenzene was withdrawn at the top of the column and the purified tolylene diisocyanate was obtained as a sidestream. The vapors exiting at the top of the column were scrubbed with o-dichlorobenzene in a gas scrubber. The scrubbed vapor stream was cooled to 2° C. in a cooler and aspirated with a liquid ring compressor to generate the negative pressure. A pressure sensor installed directly upstream of the aspiration port indicated a suction pressure of 120 mbar. The liquid ring compressor was operated with o-dichlorobenzene as the operating liquid at an operating temperature of 7° C. in recirculating liquid operation, i.e. the exiting operating liquid was recycled back to the entry port for operating liquid via a cooler. A portion of the operating liquid was continuously discharged and replaced by redistilled o-dichlorobenzene having a phosgene content of 10 ppm and a hydrogen chloride content of 2 ppm. The amount of operating liquid to be replaced was adapted at regular intervals such that an AC value of 950 ppm was established in the operating liquid exiting on the pressure side. The phosgene content was determined as 0.02% by weight and the calculated hydrogen chloride content was accordingly 0.08% by weight.

The liquid ring compressor was able to be operated over an extended period without cavitation problems.

Comparative Example 5

Pentamethylene diisocyanate which was obtained from a phosgenation of pentamethylenediamine and from which hydrogen chloride, phosgene, chlorobenzene and low-boiling secondary components had already been largely removed in a multi-stage distillation process was subjected as crude isocyanate to a continuous final distillation under vacuum. The crude isocyanate had an HC content according to ISO 15028:2014 of about 13 000 ppm. The distillation was carried out in a column with an internal condenser at a head pressure of 45 mbar(a). The vapors exiting at the top of the column were cooled to −12° C. in a cooler without preceding use of gas scrubbers and aspirated with a liquid ring compressor to generate the negative pressure. A pressure sensor installed directly upstream of the aspiration port indicated a suction pressure of 30 mbar. The liquid ring compressor was operated with chlorobenzene as the operating liquid at an operating temperature of −9° C. in recirculating liquid operation, i.e. the exiting operating liquid was recycled back to the entry port for operating liquid via a cooler. A portion of the operating liquid was continuously discharged and replaced by redistilled chlorobenzene having a phosgene content of 10 ppm and a hydrogen chloride content of 2 ppm.

There were severe cavitation noises, vibrations and an increase in the suction pressure. An analysis of the operating liquid exiting on the pressure side showed an AC value of 38 600 ppm. The phosgene content was determined as 2.8% by weight and the calculated hydrogen chloride content was accordingly 1.8% by weight. Even lowering the operating temperature to −14° C. could not rectify the problems.

The replacement rate of the operating liquid was subsequently tripled, with the result that the AC value fell to about 12 900 ppm and operation returned to normal, thus also allowing the operating temperature to be raised back up to −9° C. without further problems.

The invention claimed is:

1. A process for distillative purification of a crude isocyanate obtained from phosgenation of a corresponding amine in a distillation apparatus under vacuum to obtain a corresponding isocyanate, wherein
at least one liquid ring compressor generates a vacuum in the distillation apparatus,
an operating liquid is selected from the group consisting of chlorobenzene, dichlorobenzene, xylene, 1-chloro-2,4-dimethylbenzene, chlorotoluene and mixtures thereof for the at least one liquid ring compressor,
a pressure p is applied on a suction side of the at least one liquid ring compressor of 10 to 200 mbar(a),
the operating temperature of the at least one liquid ring compressor is −17° C. to 15° C. and
the operating liquid at an exit from the at least one liquid ring compressor has an AC value of less than 35 000 ppm, the AC value referring to acidity determined according to ASTM D 5629 for AC values <100 ppm and according to ASTM D 6099 for AC values >100 ppm, wherein the operating liquid replaces the isocyanate as matrix.

2. The process as claimed in claim 1, wherein, in the operating liquid at the exit from the at least one liquid ring compressor, the content of phosgene $c(COCl_2)$ is 0.001% to 4.5% by weight, and the content of hydrogen chloride $c(HCl)$ is ≤1.6% by weight.

3. The process as claimed in claim 1, wherein at least a portion of the operating liquid is continuously withdrawn from the at least one liquid ring compressor, cooled to a temperature of not more than 20° C., below the operating temperature of the at least one liquid ring compressor and continuously recycled to the at least one liquid ring compressor.

4. The process as claimed in claim 1, wherein the crude isocyanate is from a gas phase phosgenation or a liquid phase phosgenation.

5. The process as claimed in claim 1, wherein the operating liquid in the at least one liquid ring compressor is at least partially, replaced by operating liquid having a phosgene content of ≤1000 ppm.

6. The process as claimed in claim 1, wherein the isocyanate is selected from the group consisting of R,S-1-phenylethyl isocyanate, 1-methyl-3-phenylpropyl isocyanate, pentyl isocyanate, 6-methyl-2-heptane isocyanate, cyclopentyl isocyanate, 3-(methylthio)phenyl isocyanate, hexamethylene diisocyanate (HDI), pentamethylene diisocyanate (PDI), 1,4-butane diisocyanate, 1,8-diisocyanatooctane, 1,9-diisocyanatononane, 2-methylpentamethylene diisocyanate, 2,2-dimethylpentamethylene diisocyanate, neopentane diisocyanate, 2,2,4-trimethylhexamethylene diisocyanate, 2,4,4-trimethylhexamethylene diisocyanate, 3-isocyanatomethyl-3,5,5-trimethylcyclohexyl isocyanate (IPDI), 2,4'- and 4,4'-diisocyanatodicyclohexylmethane (H12MDI), 4,4'-diisocyanato-3,3'-dimethyldicyclohexylmethane, 2,4- and 2,6-diisocyanatomethylcyclohexane (H6TDI), 1,3-cyclohexane diisocyanate, 1,4-cyclohexane diisocyanate, 1,3-diisocyanato-2-methylcyclohexane, 1,3-diisocyanato-4-methyl-cyclohexane, 1,4-diisocyanato-3,3,5-trimethylcyclohexane, 1,3-bis(isocyanatomethyl)cyclohexane (H6XDI), 1,4-bis(isocyanatomethyl)cyclohexane, isomers of bis(isocyanatomethyl) bicyclo[2.2.1]heptane (NBDI), 1,3-xylylene diisocyanate (m-XDI), 1,4-xylylene diisocyanate (p-XDI), 1,3-bis(1-isocyanato-1-methylethyl)benzene (m-TMXDI), 1,4-bis(1-isocyanato-1-methylethyl)benzene (p-TMXDI), monomeric diphenylmethane diisocyanate, 2,4-tolylene diisocyanate, 2,6-tolylene diisocyanate, 1,5-naphthalene diisocyanate, 1,4-phenylene diisocyanate, triisocyanates, and mixtures thereof.

7. The process as claimed in claim 1, wherein a pressure p of 10 to 200 mbar(a) is generated.

8. In a process involving at least one liquid ring compressor for generating a vacuum in an apparatus for distillation of a crude isocyanate which was produced by phosgenation of the corresponding amine, that the improvement comprising
choosing an operating liquid selected from the group consisting of chlorobenzene, dichlorobenzene, xylene, 1-chloro-2,4-dimethylbenzene, chlorotoluene and mixtures thereof for the at least one liquid ring compressor,
applying a pressure p on a suction side of the at least one liquid ring compressor of 10 to 200 mbar(a),
setting an operating temperature of the at least one liquid ring compressor at −17° C. to +15° C. and
wherein the operating liquid at an exit from the at least one liquid ring compressor has an AC value of less than 35 000 ppm, the AC value referring to acidity determined according to ASTM D 5629 for AC values <100 ppm and according to ASTM D 6099 for AC values >100 ppm, wherein the operating liquid replaces the isocyanate as matrix.

9. The process as claimed in claim 8, wherein the operating liquid at the exit from the liquid ring compressor has a content of phosgene $c(COCl_2)$ of 0.001% to 4.5% by weight and a content of hydrogen chloride $c(HCl)$ of less than 1.6% by weight.

10. The process as claimed in claim 8, wherein a pressure p of 10 to 200 mbar(a) is generated.

11. A process for operating a liquid ring compressor for providing the vacuum for distillative purification of an isocyanate obtained by phosgenation of the corresponding amine in a distillation apparatus to obtain the corresponding isocyanate, wherein
an operating liquid is selected from the group consisting of chlorobenzene, dichlorobenzene, xylene, 1-chloro-2,4-dimethylbenzene, chlorotoluene and mixtures thereof for the at least one liquid ring compressor,
a pressure p on a suction side of the at least one liquid ring compressor is 10 to 200 mbar(a),
an operating temperature of the at least one liquid ring compressor is −17° C. to +15° C. and
the operating liquid at an exit from the at least one liquid ring compressor has an AC value of less than 35 000 ppm, the AC value referring to acidity determined according to ASTM D 5629 for AC values <100 ppm and according to ASTM D 6099 for AC values >100 ppm, wherein the operating liquid replaces the isocyanate as matrix.

12. The process as claimed in claim 11, wherein the operating liquid at an exit from the liquid ring compressor, has a content of phosgene $c(COCl_2)$ of 0.001% to 4.5% by weight and the content of hydrogen chloride $c(HCl)$ is less than 1.6% by weight.

13. The process as claimed in claim 11, wherein the isocyanate is selected from the group consisting of R,S-1-phenylethyl isocyanate, 1-methyl-3-phenylpropyl isocyanate, pentyl isocyanate, 6-methyl-2-heptane isocyanate, cyclopentyl isocyanate, 3-(methylthio)phenyl isocyanate, hexamethylene diisocyanate (HDI), pentamethylene diisocyanate (PDI), 1,4-butane diisocyanate, 1,8-diisocyanatooctane, 1,9-diisocyanatononane, 2-methylpentamethylene diisocyanate, 2,2-dimethylpentamethylene diisocyanate, neopentane diisocyanate, 2,2,4-trimethylhexamethylene diisocyanate and 2,4,4-trimethylhexamethylene diisocyanate, 3-isocyanatomethyl-3,5,5-trimethylcyclohexyl isocyanate (IPDI), 2,4'- and 4,4'-diisocyanatodicyclohexylmethane ($H_{12}$MDI), 4,4'-diisocyanato-3,3'-dimethyldicyclohexylmethane, 2,4- and 2,6-diisocyanatomethylcyclohexane (H6TDI), 1,3-cyclohexane diisocyanate, 1,4-cyclohexane diisocyanate, 1,3-diisocyanato-2-methylcyclohexane, 1,3-diisocyanato-4-methyl-cyclohexane, 1,4-diisocyanato-3,3,5-trimethylcyclohexane, 1,3-bis(isocyanatomethyl)cyclohexane (H6XDI), 1,4-bis(isocyanatomethyl)cyclohexane, isomers of bis(isocyanatomethyl) bicyclo[2.2.1]heptane (NBDI), 1,3-xylylene diisocyanate (m-XDI), 1,4-xylylene diisocyanate (p-XDI), 1,3-bis(1-isocyanato-1-methylethyl)benzene (m-TMXDI), 1,4-bis(1-isocyanato-1-methylethyl)benzene (p-TMXDI), monomeric diphenylmethane diisocyanate, 2,4-tolylene diisocyanate, 2,6-tolylene diisocyanate, 1,5-naphthalene diisocyanate, 1,4-phenylene diisocyanate, triisocyanates, and mixtures thereof.

* * * * *